United States Patent
Ariga

(10) Patent No.: US 6,205,137 B1
(45) Date of Patent: Mar. 20, 2001

(54) MULTIMEDIA PROCESSING SYSTEM WITH CONTROLLER EXCLUSIVELY OPERATING ON EXTRACTED CONTROL SIGNALS

(75) Inventor: Kenichi Ariga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/048,780

(22) Filed: Mar. 27, 1998

(30) Foreign Application Priority Data

Mar. 28, 1997 (JP) .................................... 9-078633

(51) Int. Cl.[7] ........................................ H04J 3/00
(52) U.S. Cl. .............................. 370/360; 370/216
(58) Field of Search .................... 370/465, 360, 370/216, 217, 218, 219, 228, 227, 225, 401, 351, 352, 441, 476, 474; 340/827, 825.01, 825.02, 825.03; 379/221

(56) References Cited

U.S. PATENT DOCUMENTS 5,896,370 * 4/1999 Eckhoff et al. .................... 370/219
5,982,745 * 11/1999 Wolff et al. ....................... 370/219

FOREIGN PATENT DOCUMENTS

| 58-170253 | 10/1983 | (JP) . |
|---|---|---|
| 61-59945 | 3/1986 | (JP) . |
| 64-81548 | 3/1989 | (JP) . |
| 64-85449 | 3/1989 | (JP) . |
| 4-92526 | 3/1992 | (JP) . |
| 5-300261 | 11/1993 | (JP) . |
| 8-223208 | 8/1996 | (JP) . |

* cited by examiner

Primary Examiner—Dang Ton
(74) Attorney, Agent, or Firm—Sughrue, Mion, Zinn, Macpeak & Seas, PLLC

(57) ABSTRACT

In a multimedia processing system, a switch receives, from a network, a request containing a control signal and a program signal when write mode is requested or a control signal only when read mode is requested, and establishes a path. Each of a number of processors receives the request when it is connected to the established path and extracts a control signal from the request. Each processor includes a LAN interface which is connected to a LAN interface of a storage unit. A controller receives the request from the switch via a LAN interface. The controller is also connected to the LAN interfaces of the processors and the storage unit for selecting one of the processors according to the request and controlling the switch and the storage unit to establish the path between the network and the selected processor so that it extracts a control signal from the request. The controller determines a request mode from the extracted control signal, and controls the selected processor and the storage unit to write the program signal therein or transfer a stored program signal therefrom to the selected processor depending on the determined request mode.

8 Claims, 2 Drawing Sheets

MULTIMEDIA PROCESSING SYSTEM WITH CONTROLLER EXCLUSIVELY OPERATING ON EXTRACTED CONTROL SIGNALS

BACKGROUND OF THE INVENTION

1. Field of the Invention

The present invention relates generally to automatic response systems, and more specifically to a multimedia processing system for storing program data and returning stored program data in response to a subscriber's request.

2. Description of the Related Art

Multimedia processing systems are installed in public telephone exchanges as automatic response systems. In a large-scale multimedia processing system a plurality of multimedia processors and a plurality of mass storage units are provided and they are interconnected by a switching hub. A request from the subscriber contains a control signal and a multimedia program signal such as voice, text and facsimile if write mode is requested and contains a control signal only if read mode is requested. One of the processors is selected to process the request. The processed request is applied to the switching hub. When the request is a write mode, both control and program signals of the request are self-routed by the switching hub to one of the storage units according to the address contained in the request and the program signal is stored in the storage unit. When the request is a read command, the control signal of the request is self-routed to the desired storage unit and a scored program is retrieved. The retrieved program signal is self-routed by the switching hub and transmitted back to the selected processor and thence to the requesting subscriber.

Since the program signal is voluminous, a great number of electronic elements are needed to construct a switching hub. Furthermore, the whole system is organized in a redundant configuration to ensure uninterrupted service. Therefore, the cost performance of the switching hub is low.

Japanese Laid-Open Patent Specification Hei-4-92526 discloses a switch for interconnecting a number of user terminals and multiple service units according to a control signal from a system controller. A bus system is provided in the switch and the system controller uses the LAN technology to send the control signal through the bus to establish connections in the switch and reconfigure its routing pattern in the event of a failure. The system controller thus process all the signals which are routed through the established connections. If the signals are voluminous, a heavy burden will be imposed on the system control, and as a result, it must be operated at a significantly high speed.

SUMMARY OF THE INVENTION

It is therefore an object of the present invention to provide a cost effective multimedia processing system.

According to a first aspect of the present invention, there is provided a multimedia processing system comprising a switch for establishing a path when it receives, from a switched network, a request containing a control signal and a program signal when write mode is requested or a control signal only when read mode is requested. A number of processors and at least one storage unit are provided. Each processor receives the request when it is connected to the established path and extracts a control signal from the request. A controller is responsive to the request from the switch for selecting one of the processors and controls the switch to establish a path between the network and the selected processor so that the control signal of the request is extracted from the request by the selected processor. The controller determines a request mode from the extracted control signal. Depending on the determined request mode, the controller controls the selected processor and storage unit to write the program signal into the storage unit or transfer a stored program signal from the storage unit to the selected processor.

According to a second aspect, the present invention provides a multimedia processing system comprising a switch for receiving, from a switched network, a request containing a control signal and a program signal when write mode is requested or a control signal only when read mode is requested, and establishing a path. A working processor and a spare processor are provided, each of the processors receiving the request when the processor is connected to the established path and extracting a control signal from the request. A storage unit is associated with both of the working and spare processors. A controller is responsive to the request from the switch for selecting the working processor when it is properly functioning or selecting the spare processor when the working processor is not properly functioning, and controlling the switch to establish the path between the network and the selected processor so that the control signal of the request is extracted from the request by the selected processor. The controller determines a request mode from the extracted control signal, and depending on the determined request mode, it controls the selected processor and the storage unit to write the program signal into the storage unit or transfer a stored program signal from the storage unit to the selected processor.

BRIEF DESCRIPTION OF THE DRAWINGS

The present invention will be described in further detail with reference to the accompanying drawings, in which.

DETAILED DESCRIPTION

Figure 1:
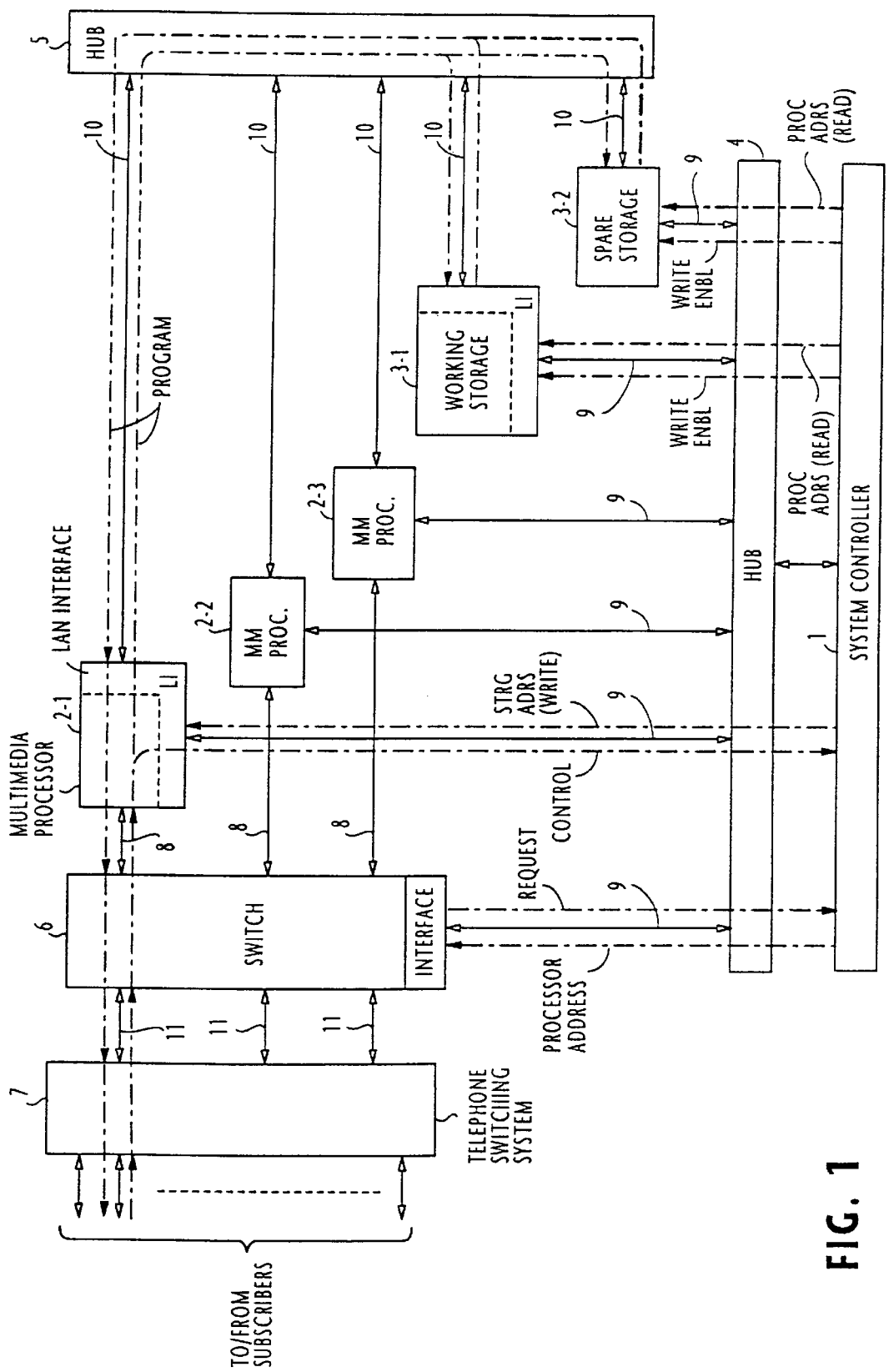
FIG. 1 is a block diagram of a replicated multimedia processing system according to a first embodiment of the present invention.

Referring to FIG. 1, there is shown a multimedia processing system according to one embodiment of the present invention. The system includes a system controller 1 connected via a repeater hub 4 and buses 9 to a plurality of multimedia processors 2-1, 2-2 and 2-3, a working storage unit 3-1, a spare storage unit 3-2 and a switch 6. Communication between the controller 1 and the associated circuits is based on the same bus accessing and destination addressing technologies as those used in local area networks. Communication between multimedia processors 2 and storage units 3 is also based on the same LAN technology using buses 10 and a hub 5. Therefore, all signals are sent in frames containing a destination address. To this end, the system controller 1, multimedia processors 2, storage units 3 and switch 6 each include a LAN interface designated LI.

More specifically, each interface LI has a queuing buffer for storing incoming signals and the function of obtaining the right to use the associated bus prior to transmission. After acquiring the right to use, the interface unit segments the signal into one or more blocks of appropriate length, inserts each block in a frame, appends a destination address to the frame and forwards it from the buffer onto the associated bus. On receiving a frame, the interface examines the address field of the frame. If the frame contains the address of the interface, the payloads are extracted from the frames and reassembled into a data stream.

Multimedia processors 2 are connected to corresponding ports of the switch 6 through lines 8. Switch 6 is connected to a telephone switching system 7 via lines 11. Subscriber lines are terminated on the switching system 7 as illustrated.

The operation of the system will be better understood by the flow of signals indicated in FIG. 1 by thin chain-dot lines when the working storage unit 3-1 is used during normal mode and by thick chain-dot lines when the spare storage unit 3-2 is used when the working storage unit 3-1 is faulty.

In response to a service request from a subscriber, the telephone switching system 7 selects one of the lines 11 and establishes a connection between the requesting subscriber and the selected line 11. Through the connection established in the switching system 7, the request is submitted to the switch 6, which informs the system controller 1 of the arrival of a service request. System controller 1 selects multimedia processor 2-1, for example, and returns the address of the selected processor to the switch 6. Using this address information, the switch 6 forwards the request to the selected multimedia processor 2-1.

If the service request is a write command, it contains a control signal and a program (data) signal such as voice, text and facsimile, and if the request is a read command, it contains a control signal only.

If the service request is a write command, the multimedia processor 2-1 extracts the control signal from the request and sends it to the system controller 1. System controller 1 examines the control signal and determines the type of the request. Since the request is a write command, the system controller 1 returns the addresses of both working and spare storage units 3-1 and 3-2 to the multimedia processor 2-1 and sets both of the storage units into a write mode. In response to the address signal from the system controller 1, the multimedia processor 2-1 segments the program signal into blocks, inserts each block into the payload field of a frame, appends the addresses of the storage units 3-1 and 3-2 to the frame and forwards it onto the repeater hub 5. On reading its own address contained in each frame, each storage unit extracts payloads from the frames and reassembles them into a data stream and stores it into an appropriate storage location.

If the service request is a read command, multimedia processor 2-1 sends it to the system controller 1. In response, the system controller 1 determines whether or not the working storage unit 3-1 is properly functioning.

If the working storage unit 3-1 is properly functioning, the system controller 1 makes a search through it for the requested program data. If the requested program is found in that storage unit, the system controller supplies the address of the selected multimedia processor 2-1 to the storage unit 3-1. If the working storage unit 3-1 is not properly functioning, the system controller 1 turns to the spare storage unit 3-2 and searches for the requested material. If it is found, the system controller 1 informs the spare storage unit 3-2 of the address of multimedia processor 2-1.

In either case, the system controller 1 instructs the properly functioning storage unit to read the requested program from its storage location and proceed to perform a bus access and frame transmission process. Therefore, the storage unit segments the retrieved program data into blocks of appropriate length, inserts each block into the payload field of a frame, appends the address of the selected multimedia processor 2-1 to the frame, and forwards it onto the hub 5. The frame is thus propagated over the buses 10. Since the multimedia processors and the storage units are all connected to the buses 10, they receive the transmitted frames and examine their destination address. The selected processor 2-1 thus finds its own address in the destination field of the frames, and extracts the payloads from the frames and reassembles them into a data stream and transmits it to the requesting subscriber via the path established through the switch 6.

Because of the use of the LAN technology, the storage units 3-1, 3-2 are time-shared among the processors 2-1 to 2-3. Thus, no data collisions occur on the buses 10. However, this embodiment is particularly suitable for light load applications.

It is seen that the system controller 1 only needs to handle control signals, this arrangement saves it from the burden of handling the voluminous program data.

Figure 2:
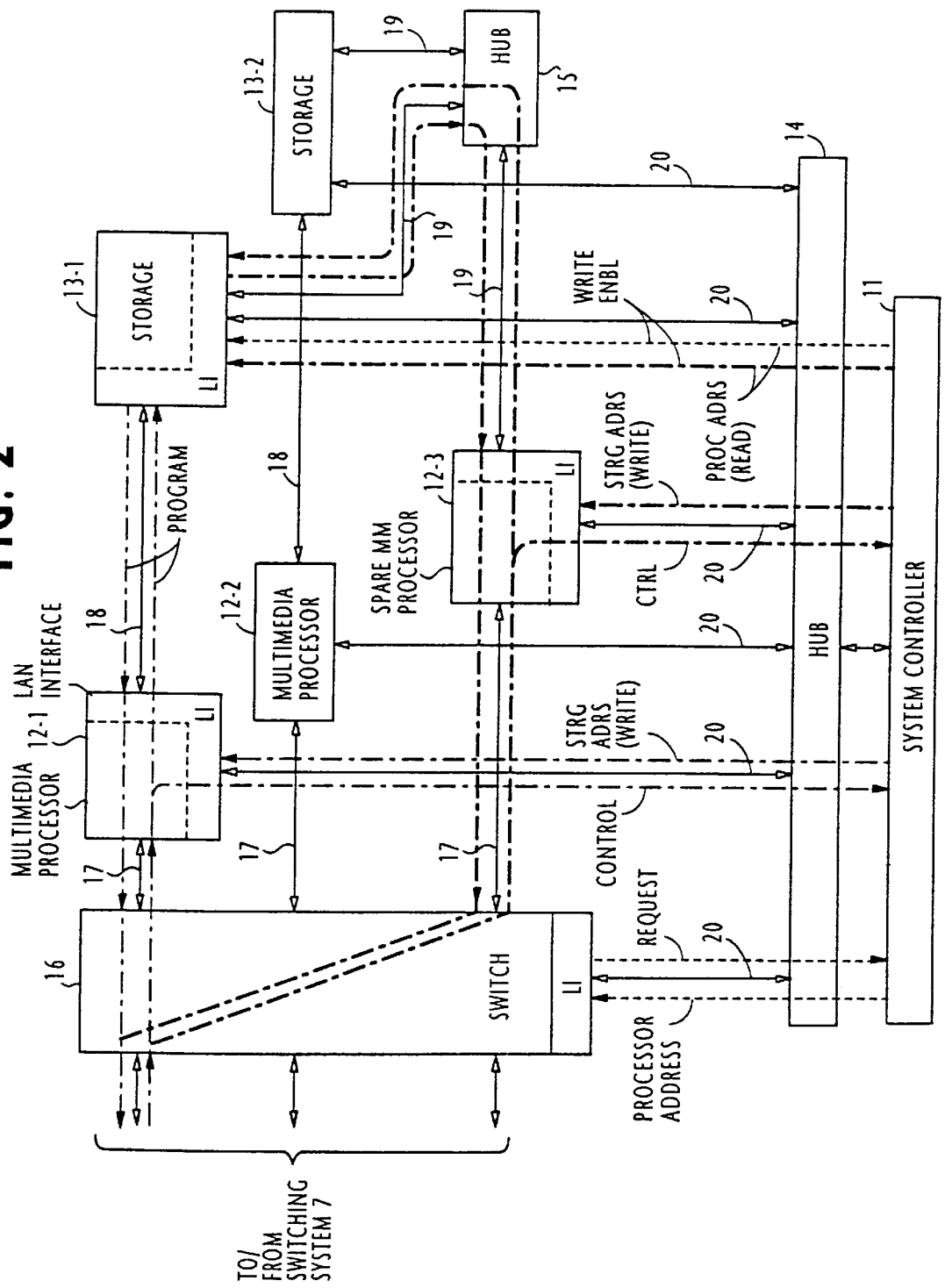
FIG. 2 is a block diagram of a replicated multimedia processing system according to a second embodiment of the present invention.

A modified embodiment of the present invention is shown in FIG. 2. In this modification, working multimedia processors 12-1 and 12-2 are respectively connected by buses 18 to storage units 13-1 and 13-2 in a one-to-one relationship. A spare multimedia processor 12-3 is provided, which is also connected to the storage units 13-1 and 13-2 via a repeater hub 15 and buses 19. A switch 16 is connected by lines 17 to the multimedia processors 12-1 to 12-3 for establishing connections between these processors and the telephone switching system 7 in the same manner as in the previous embodiment. System controller 11 is connected via a hub 14 to the switch 16, the multimedia processors 12 and the storage units 13 via respective buses 20. Similar to the previous embodiment, switch 6, each multimedia processor 12 and storage units 13 are provided with a LAN interface for transfer of signals in frames over buses 18, 19 and 20.

The reason for using the dedicated buses 18 and LAN technology for interconnecting the working multimedia processors 12 and the associated storage units 13 is to obtain the cost benefit of using the same type of design for all multiprocessors 12-1, 12-2 and 12-3.

The operation of the system of FIG. 2 proceeds as indicated by thin chain-dot lines when the multimedia processor 12-1 is used as a working unit and by thick chain-dot lines when the spare multimedia processor 12-3 is used instead of the processor 12-1 when the latter is not functioning properly.

A subscriber's service request is switched through the telephone switching system to the switch 16, which informs the system controller 11 of the arrival of the request. In response, the system controller 11 selects the multimedia processors 12-1, for example, if the storage unit 13-1 is properly functioning, and returns the address of this processor to the switch 16. Using this address information, the switch 16 forwards the request to multimedia processor 12-1.

If the service request is a write command, the selected multimedia processor 12-1 extracts the control signal from the request and sends it to the system controller 11. System controller 11 examines the control signal and determines the type of service. Because of the write command, the system controller 11 returns the address of storage unit 13-1 and instructs it to perform a frame transmission process. At the same time, the controller 11 sends a write enable signal to the storage unit 13-1. Multimedia processor 12-1 thus extracts the program data from the received request, segments it into blocks, inserts them into the payload fields of frames, appends the address of storage unit 13-1 to the frames and forwards them to the associated storage unit 13-1. On the other hand, the storage unit 13-1, on detecting its own address in the frames, extracts the payloads, reassembles them into a data stream and stores it into a storage location.

If the service request is a read command, multimedia processor 12-1 sends it to the system controller 11. System controller 11 makes a search through the storage unit 13-1 for the requested program. If the requested program is found in that storage unit, the system controller 11 sends a read enable signal and the address of processor 12-1 to the storage unit 13-1 to instruct it to read the requested program therefrom, segment the retrieved program into blocks, insert them into the payload fields of frames and append the address of the selected multimedia processor 12-1 to the frames. The frames are then forwarded from the storage unit 13-1 to the processor 12-1, which extracts the payloads and reassembles them into a data stream and transmits it to the requesting subscriber.

If the multimedia processor 12-1 is not properly functioning, the spare processor 12-3 is selected by the system controller 11 in response to a service request and the switch 16 establishes a connection to that multimedia processor as illustrated.

If the request is a write command, the spare processor 12-3 extracts the control signal from the request and sends it to the system controller 11. System controller 11 examines the control signal and returns the address of the storage unit 13-1 to the processor 12-3 and instructs it to extract the program data from the received request and to perform a frame transmission process. Thus, the multimedia processor 12-3 segments the program data into blocks, inserts them into the payload fields of frames, append the address of the storage unit 13-1 to the frames, and forwards the frames to the hub 15. At the same time, the system controller 11 sends a write enable signal to the storage unit 13-1. The transmitted frames are propagated to storage units 13-1 and 13-2. Since the storage unit 13-1 detects its own address in the frames and receives the write enable signal from the controller 11, it extracts the payloads from the frames, reassembles them into a data sequence and stores it into a storage location.

If the service request is a read command, the spare processor 12-3 sends it to the system controller 11. System controller 11 makes a search through the storage unit 13-1 for the requested program. If the requested program is found in that storage unit, the system controller 11 sends the address of processor 12-3 to the storage unit 13-1 and instructs it to perform a data reading and frame transmission process. Therefore, the storage unit 13-1 reads the requested program from the storage unit 13-1, segments it into blocks, inserts them into the payload fields of frames and appends the address of the spare processor 12-3 to the frames, and forwards the frames to the hub 15. The frames are propagated to the processor 12-3 as well as to storage unit 13-2. Since the processor 12-3 finds its own address in the frames, it extracts the payloads and reassembles them into a data stream and transmits it to the requesting subscriber.

Since the voluminous program data are distributed among separate storage units, the modified embodiment is particularly suitable for heavy load applications.

What is claimed is:

1. A multimedia processing system comprising:

a switch for receiving, from a switched network, a request containing a control signal and a program signal when write mode is requested or containing the control signal only when read mode is requested, and establishing a path;

a plurality of processors, each processor receiving the request when the processor is connected to the established path and extracting the control signal from the received request;

a storage unit; and a controller responsive to the request from the switch for selecting one of said processors, controlling the switch to establish said path between said network and the selected processor so that the control signal of the request is extracted from the request by the selected processor, determining a request mode from the extracted control signal, and controlling the selected processor and the storage unit to write the program signal therein or transfer a stored program signal therefrom to the selected processor depending on the determined request mode.

2. A multimedia processing system as claimed in claim 1, wherein said storage unit comprises a working storage unit and a spare storage unit, wherein said controller is arranged to:

control the selected processor and the working and spare storage units to write said program signal into the working and spare storage units; and control the working storage unit to transfer said stored program signal therefrom to the selected processor when the working storage unit is properly functioning, or control the spare storage unit to transfer a copy of the stored program signal therefrom to the selected processor when the working storage unit is not properly functioning.

3. A multimedia processing system comprising:

a switch for receiving, from a switched network, a request containing a control signal and a program signal when write mode is requested or containing the control signal only when read mode is requested, and establishing a path;

a working processor and a spare processor, each of the working and spare processors receiving the request when the processors are connected to the established path and extracting the control signal from the request;

a storage unit; and a controller responsive to the request from the switch for selecting the working processor when the working processor is properly functioning or selecting the spare processor when the working processor is not properly functioning, controlling the switch to establish said path between said network and the selected processor so that the control signal of the request is extracted from the request by the selected processor, determining a request mode from the extracted control signal, and controlling the selected processor and the storage unit to write the program signal therein or transfer a stored program signal therefrom to the selected processor depending on the determined request mode.

4. A multimedia processing system comprising:

a switch for receiving, from a switched network, a request containing a control signal and a program signal when write mode is requested or containing the control signal only when read mode is requested, establishing a path;

first and second working processors and a spare processor, each of the first and second working processors and the spare processor receiving the request when the first and second working processors and the spare processor are connected to the established path and extracting the control signal from the request;

first and second storage units; and a controller responsive to the request from the switch for selecting one of the first and second working processors when both of the first and second working processors are properly functioning or selecting the spare processor when one of the first and second working processors is not properly functioning, controlling the switch to establish said path between said network and the selected processor so that the control signal of the request is extracted from the request by the selected processor, determining a request mode from the extracted control signal, and controlling the selected processor and one of the first and second storage units to write the program signal therein or transfer a stored program signal therefrom to the selected processor depending on the determined request mode.

5. A multimedia processing system comprising:

a switch for receiving, from a switched network, a request containing a control signal and a program signal when write mode is requested or containing the control signal only when read mode is requested, and establishing a path, the switch including a LAN interface;

a plurality of processors, each of the processors receiving the request when the processors are connected to the path and extracting the control signal from the request, said processors each including a LAN interface;

a storage unit including a LAN interface connected to the LAN interfaces of the processors; and a controller including a LAN interface connected to all of said LAN interfaces, the controller being responsive to the request from the switch for selecting one of said processors, controlling the switch to establish said path between said network and the selected processor so that the control signal of the request is extracted from the request by the selected processor, determining a request mode from the extracted control signal, and controlling the selected processor and the storage unit to write the program signal therein or transfer a stored program signal therefrom to the selected processor depending on the determined request mode.

6. A multimedia processing system as claimed in claim 5, wherein said storage unit comprises a working storage unit and a spare storage unit, wherein said controller is arranged to:

control the selected processor and the working and spare storage units to write said program signal into the working and spare storage units; and control the working storage unit to transfer said stored program signal therefrom to the selected processor when the working storage unit is properly functioning, or control the spare storage unit to transfer a copy of the stored program signal therefrom to the selected processor when the working storage unit is not properly functioning.

7. A multimedia processing system comprising:

a switch for receiving, from a switched network, a request containing a control signal and a program signal when write mode is requested or containing the control signal only when read mode is requested, and establishing a path, said switch including a LAN interface;

a working processor and a spare processor, each of the working and spare processors receiving the request when the processors are connected to the established path and extracting the control signal from the request, said processors each including a LAN interface;

a storage unit including a LAN interface connected to the LAN interface of the working processor; and a controller including a LAN interface connected to all of said LAN interfaces, the controller being responsive to the request from the switch for selecting the working processor when the working processor is properly functioning or selecting the spare processor when the working processor is not properly functioning, controlling the switch to establish said path between said network and the selected processor so that the control signal of the request is extracted from the request by the selected processor, determining a request mode from the extracted control signal, and controlling the selected processor and the storage unit to write the program signal therein or transfer a stored program signal therefrom to the selected processor depending on the determined request mode.

8. A multimedia processing system comprising:

a switch for receiving, from a switched network, a request containing a control signal and a program signal when write mode is requested or containing the control signal only when read mode is requested, establishing a path, said switch including a LAN interface;

first and second working processors and a spare processor, each of the first and second working processors and the spare processor receiving the request when the first and second working processors and the spare processor are connected to the path and extracting the control signal from the request, said first and second working processors and said spare processor each including a LAN interface;

first and second storage units, each including a LAN interface, the LAN interfaces of the storage units being connected respectively to the LAN interfaces of the first and second working processors; and a controller including a LAN interface connected to all of said LAN interfaces, the controller being responsive to the request from the switch for selecting one of the first and second working processors when both of the first and second working processors are properly functioning or selecting the spare processor when one of the first and second working processors is not properly functioning, controlling the switch to establish said path between said network and the selected processor so that the control signal of the request is extracted from the request by the selected processor, determining a request mode from the extracted control signal, and controlling the selected processor and one of the first and second storage units to write the program signal therein or transfer a stored program signal therefrom to the selected processor depending on the determined request mode.

* * * * *